United States Patent [19]

Bartholomäus et al.

[11] 4,413,245

[45] Nov. 1, 1983

[54] INDUCTIVE MEASURING TRANSDUCER FOR A FLUIDIC ADJUSTING MEMBER

[75] Inventors: Reiner Bartholomäus, Neuendorf; Christoph Gibas, Neunkirchen; Hans Wölfges; Ferdinand Hess, both of Lohr; Karl Schiene, Sulzbach, all of Fed. Rep. of Germany

[73] Assignee: Mannesmann Rexroth GmbH, Fed. Rep. of Germany

[21] Appl. No.: 294,214

[22] Filed: Aug. 19, 1981

Related U.S. Application Data

[63] Continuation of Ser. No. 136,327, Apr. 1, 1980, abandoned.

[30] Foreign Application Priority Data

Apr. 7, 1979 [DE] Fed. Rep. of Germany ....... 2914195

[51] Int. Cl.³ ..................... H01F 15/04; H01F 21/06
[52] U.S. Cl. ................................ 336/84 M; 336/96; 336/136
[58] Field of Search ............... 336/30, 83, 130, 84 M, 336/136, 84 R, 96; 174/149 R

[56] References Cited

U.S. PATENT DOCUMENTS

| | | | |
|---|---|---|---|
| 1,504,859 | 8/1924 | Brady | 174/149 R |
| 2,417,097 | 3/1947 | Warshaw | 336/136 X |
| 2,482,902 | 9/1949 | Clark | 336/136 X |
| 2,564,221 | 8/1951 | Hornfeck | 336/136 X |
| 2,782,385 | 2/1957 | Collett | 336/136 X |
| 2,819,431 | 1/1958 | Maxwell | 336/136 X |
| 2,942,333 | 6/1960 | Mason | 336/136 X |
| 3,221,281 | 11/1965 | Roeger | 336/136 X |
| 3,234,491 | 2/1966 | Baur | 336/136 X |
| 3,492,616 | 1/1970 | Singleton et al. | 336/136 X |

FOREIGN PATENT DOCUMENTS

2631846 12/1977 Fed. Rep. of Germany ...... 336/136

*Primary Examiner*—Thomas J. Kozma
*Attorney, Agent, or Firm*—Roylance, Abrams, Berdo & Farley

[57] ABSTRACT

An inductive measuring transducer impermeable to pressure media for use with a fluidic adjusting member such as a multiple position valve as a receiving casing of non magnetic working material for receiving a magnetic core, coils surrounding the casing which are, in turn, surrounded by a housing. An operating rod passes into the casing through a connecting member and operates the core. The casing is formed as continuous, hollow cylindrical tube with a closing member or plug inserted in one end and attached in fluid tight relationship. The other end of the receiving casing is tightly connected with the connecting member which is formed as a separate part from the receiving casing.

4 Claims, 3 Drawing Figures

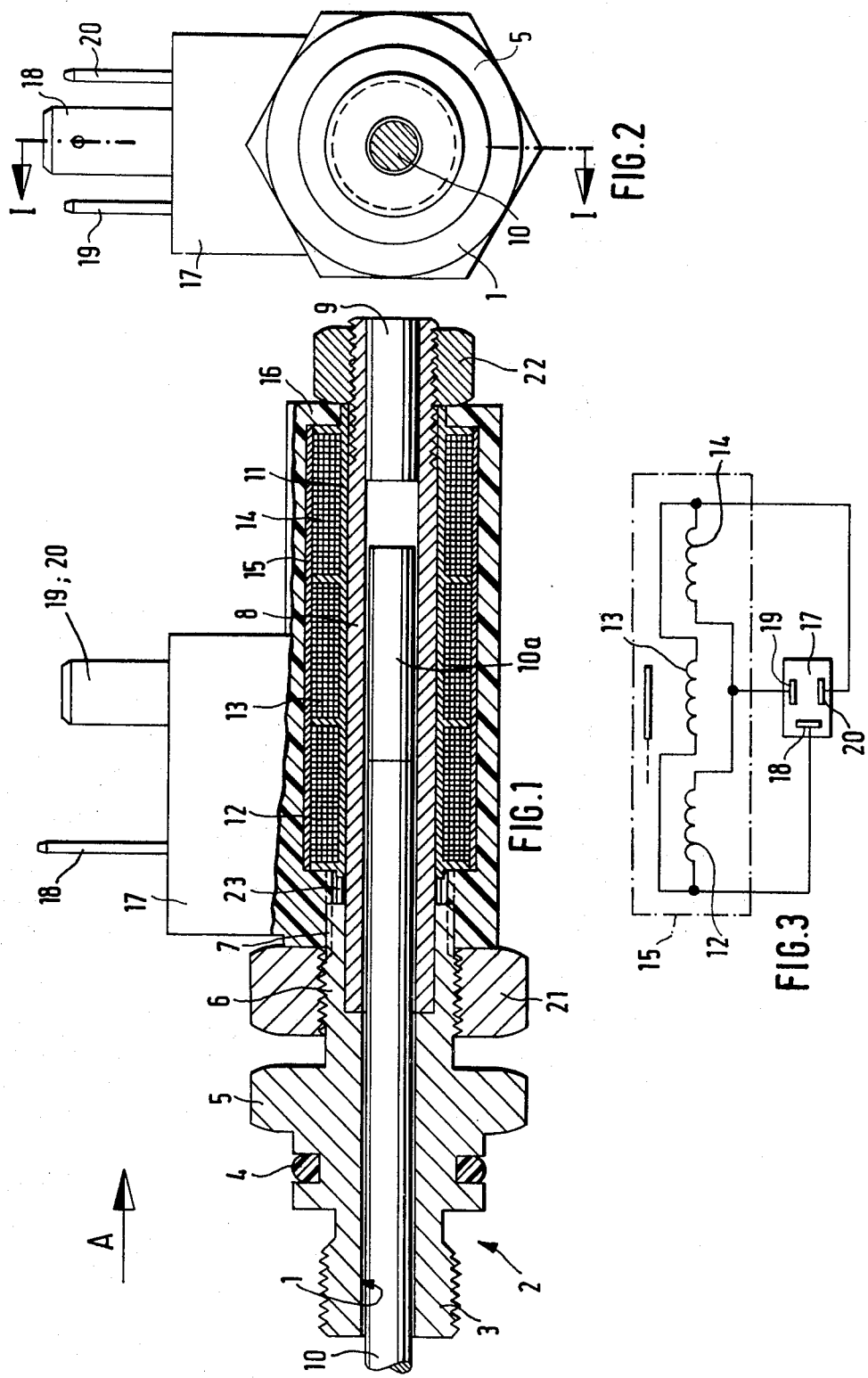

INDUCTIVE MEASURING TRANSDUCER FOR A FLUIDIC ADJUSTING MEMBER

This is a continuation of application Ser. No. 136,327, now abandoned, filed Apr. 1, 1980.

This invention relates to an inductive transducer for sensing the position of a movable member.

BACKGROUND OF THE INVENTION

In a known measuring transducer, as shown in German Auslegeschrift No. 26 31 846, a coil arrangement surrounds a receiving casing in which a movable member is placed, the movable member interacting with the coils. The receiving casing is formed in one piece as a cylinder having a blind bore therein, the end of the cylinder having a thick bottom. The housing surrounding the coils at a distance is held at one end by a supporting plate being supported by the receiving casing and at its other end by a covering lid connected with the receiving casing, the lid containing the electrical connections. The receiving casing consists of a non-magnetic working material which is difficult to process, and which must be formed from the solid material, which is very expensive. Also, the prior art transducer occupies considerable space.

BRIEF DESCRIPTION OF THE INVENTION

An object of the present invention is to provide an inductive measuring transducer having a receiving casing which is formed with considerably lower expenditure for the working material and which can be produced with little labor, and which, additionally, occupies only a small space.

Briefly described, the invention includes an improved inductive measuring transducer which is impermeable to fluid pressure agents for use with a fluidic adjustable member such as a multiple position valve or flow valve, the transducer being of the type comprising a receiving casing of non-magnetic material for receiving a core, a plurality of coils surrounding the receiving casing, a housing surrounding the coils, and a connecting member, the improvements wherein said receiving casing comprises a continuous, hollow tube having a plug closing one end thereof in fluid tight relationship, and said connecting member is formed as a separate component from said receiving casing and is fixedly connected to the exterior of the other end of said tube in fluid tight relationship.

With this structural arrangement, the cylindrical tube comprising the receiving casing requires only little processing. Its free end is closed in a simple manner by a cylindrical plug or closing member, and the other end thereof is connected, also in a simple manner, with the connecting member. The entire transducer thus occupies only a little space.

The housing can comprise a body of polymeric material, formed by extrusion, centrifugal or other casting, and is therefore easily formed.

The housing and coil arrangement is arranged to be axially movable relative to the receiving casing and is provided with adjusting nuts by which the relative location, from an initial position, of the coils relative to the core within the receiving tube is adjusted in a simple fashion.

Furthermore, the coils can be enclosed within a shielding structure of ferro magnetic material, providing simple electro magnetic screening with respect to outside interference. Additionally, the transducer is preferably formed using three coils, co-axially aligned, with the outer coils being connected in series circuit relationship with each other and the series circuit being connected in parallel circuit relationship with the center coil.

In order that the manner in which the foregoing and other objects are attained in accordance with the invention can be understood in detail, particularly advantageous embodiments thereof will be described with reference to the accompanying drawings, which form a part of this specification, and wherein;

FIG. 1 is a side elevation, in longitudinal section, of a transducer in accordance with the invention;

FIG. 2 is an end elevation of the apparatus of FIG. 1; and

FIG. 3 is a schematic circuit diagram showing the circuit connection of the elements therein.

Turning now to the drawings in detail, it will be seen that FIG. 1 shows a connecting member 2 which is provided with an axial, central bore 1, the connecting member 2 having external threads 3 at one outer end thereof. Axially spaced from the threaded end is an annular groove for receiving a gasket 4, and the connecting member is provided with an enlarged portion 5 having a hexagonal exterior to which a wrench can be applied for tightening the structure. The inner end of the connecting member 2 is provided with an externally threaded portion 6 and, inwardly adjacent thereto a plurality of axially grooves, forming a series of projections and recesses extending from the threads to the distal inner end of the connecting member. The ribs or projections and grooves are in the nature of splines. The inner end of body 7 has an axially extending annular recess to receive one end of the hollow cylindrical receiving tube 8, which forms the receiving casing, and which consists of a non-magnetic working material such as, for example, a chromimum-nickel-steel alloy. A solid cylindrical body 9 is inserted into the outer end of tube 8 to form a plug or closing member. The plug similarly consists of a non-magnetic working material and is fixedly connected within casing 8 by any convenient technique such as hard soldering, gluing, flanging, or the like, so that the plug is in fluid tight relationship with the casing. The end of the casing inserted into connecting member 8 is similarly fixedly attached to form a joint which is impermeable to liquid or gas. An axially shiftable rod 10 projects through the bore in the connecting member 2 and into the receiving casing 8, rod 10 having a coil core 10a at the end thereof, the core being made of a ferro magnetic working material.

An axially shiftable coil body 11 surrounds tube 8 and accomodates three coils 12, 13, and 14 which are surrounded by a shielding jacket 15 made of a magnetic working material.

The shielding jacket 15 and the coil body 11 are surrounded by a polymeric body forming a housing 16 from which a connecting piece 17 projects, the connecting piece having electrical plug pins 18, 19 and 20 projecting therefrom, the pins making electrical connection with the ends of the coils. This plastic body can be formed by extruding, centrifuging or casting.

Shielding jacket 15 performs the function of protecting coils 12-14 during the production process of the housing and subsequently shields the coils from magnetic interference fields during operation of the apparatus.

At opposite ends of the housing 16 there are provided adjustment nuts, nut 21 being engaged with threads 6 of connecting member 2 and nut 21 engaging external threads on the end of casing 8 outside of plug 9. Housing 16 engages the longitudinal grooves 7 provided on the inner end of connecting member 2. When the working material used to form housing 16 permits, that housing can be formed with no internal grooves, the grooves to mate with grooves 7 being formed by forcing the housing onto the inner end of the connecting member, permitting the ribs thereon to dig into the housing material to form a relationship which prevents relative rotation. Between the body of coil 11 and the inner end of connecting member 2 there is a space 23. The axial location of coils 12–14 with respect to the receiving tube 8 can be adjusted by using nuts 21 and 22.

As shown in FIG. 3, coils 12 and 14 are connected in series circuit relationship with each other and coil 13 is connected in parallel relationship with the series connection of coils 12 and 14. The plug pin 18 is electrically connected at one end of the parallel circuit at the junction between coils 12 and 13, and pin 19 is connected at the mid point of the series circuit between coils 12 and 14. Pin 20 is connected to the other end of the parallel circuit relationship at the junction between coils 13 and 14. Additionally, pin 18 is grounded and is electrically connected with the shielding jacket 15.

The connecting member 2, which is illustrated as being an independent body in the embodiment shown, may also be a portion of a housing of a device such as a proportional valve.

The inductive measuring transducer thus described has a requirement for small space, consists of simple components, and can be produced cheaply in a simple manner an in large production quantity. The coils can be freely adjusted by hydraulic forces with respect to receiving tube 8.

During the operation of the device, core 10a moves axially within receiving tube 8 and does not move out of the region of middle coil 13. In its middle position, half of the core is always penetrating into the two outside coils 12 and 14.

While certain advantageous embodiments have been chosen to illustrate the invention it will be understood by those skilled in the art that various changes and modifications can be made therein without departing from the scope of the invention as defined in the appended claims.

What is claimed is:

1. An improved inductive measuring transducer which is impermeable to fluid pressure agents for use with a fluidic adjustable member such as a multiple position valve or flow valve, the transducer being of the type comprising a receiving casing of non-magnetic material for receiving a core, a plurality of coils surrounding said receiving casing and the core, a housing surrounding said coils, and a connecting member, the improvements wherein said receiving casing comprises a single continuous, hollow cylindrical tube having a plug seated directed in and closing one end thereof in fluid tight relationship;

said connecting member is formed as a separate component from said receiving casing and is fixedly connected to the exterior of the other end of said tube in fluid tight relationship, said connecting member being spaced from said coils to permit adjustment of the relative positions thereof;

said housing comprises a body of polymeric material completely enclosing said coils;

said housing and said coils surround said receiving casing and are axially movable as a unit relative to said receiving casing between said connecting member and said one end of said receiving casing;

said core is disposed on one end of a rod, and said core and rod have substantially equal transverse cross-sectional dimensions;

first and second adjusting nut means are mounted at opposite ends of said housing for adjusting the axial position of said housing and coils relative to said casing and for firmly holding said housing and coils against movement; and means are provided on said housing and said connecting member for preventing relative rotation between said coils and said casing, said means for preventing rotation including a plurality of mating projections and recesses formed in said housing and said connecting member.

2. A transducer according to claim 1 wherein only one of said housing and said connecting member is provided with a plurality of rotation preventing projections and recesses before assembly, and mating recesses and projections are formed in the other of said housing and connecting member upon assembly thereof.

3. A transducer according to claim 1 and further comprising a shielding jacket of magnetic working material surrounding said coils.

4. A transducer according to claim 3 including three coaxially aligned coils and including electrical circuit means connecting the end ones of said coils in series circuit relationship and the center coil in parallel circuit relationship with said series circuit.

* * * * *